W. W. Riley,
Gate.
Nº 75,792.      Patented Mar. 24, 1868.
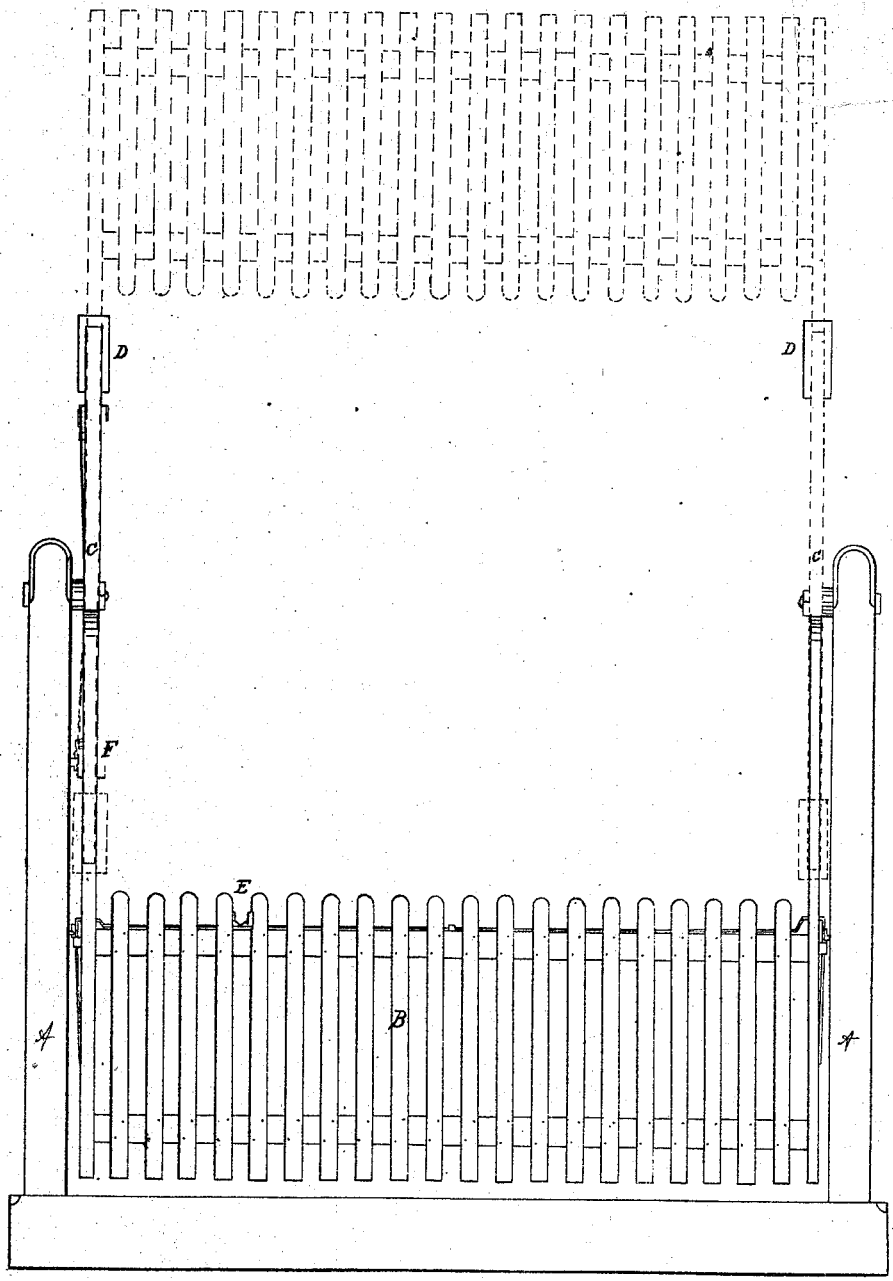
Witnesses.
Edgar Wright
M. V. B. Pitkin
Inventor.
W. Willshire Riley.

United States Patent Office.

W. WILLSHIRE RILEY, OF COLUMBUS, OHIO.

Letters Patent No. 75,792, dated March 24, 1868.

IMPROVEMENT IN GATES.

The Schedule referred to in these Letters Patent and making part of the same.

Be it known that I, W. WILLSHIRE RILEY, of Columbus, in the county of Franklin, and State of Ohio, have invented a new Mode of Constructing and Operating Farm-Gates; and I do hereby declare that the following is a full, clear, and exact description of the construction and operation of the same, reference being had to the annexed drawings, making a part of this specification, in which the figure shown in black is a side elevation of the gate as it will appear when closed, and the figure shown in red represents the gate when open.

The nature of my improvement consists in attaching to each end of the gate a long arm or lever, which is pivoted to the posts, one at each end of the gate, and providing these arms with suitable balances, weights, and spring-latches, all so arranged that the gate can be revolved in between the posts, and can be fastened either up or down.

Letters A A represent the gate-posts; B, the gate; C C, the arms or levers, which are pivoted to the posts by means of a stud-bolt, or otherwise. D D represent the balance-weights, which can be made of wood, boxes of sand, iron, or any suitable material, as desired by the manufacturer. E represents a small double lever, for operating, by means of two iron rods, the two spring-catches at each end of the gate at the same time. F shows in red the upper spring-catch for holding the gate in its proper position when open.

What I claim as my invention, and desire to secure by Letters Patent, is—

Swinging or revolving the gate between two posts, by means of two pivoted arms and balance-weights, as shown and described.

W. WILLSHIRE RILEY.

Witnesses:
    M. V. B. PITKIN,
    R. K. SIEG.